CLOCK FREQUENCY AND PHASE CORRECTION
Filed Dec. 20, 1968
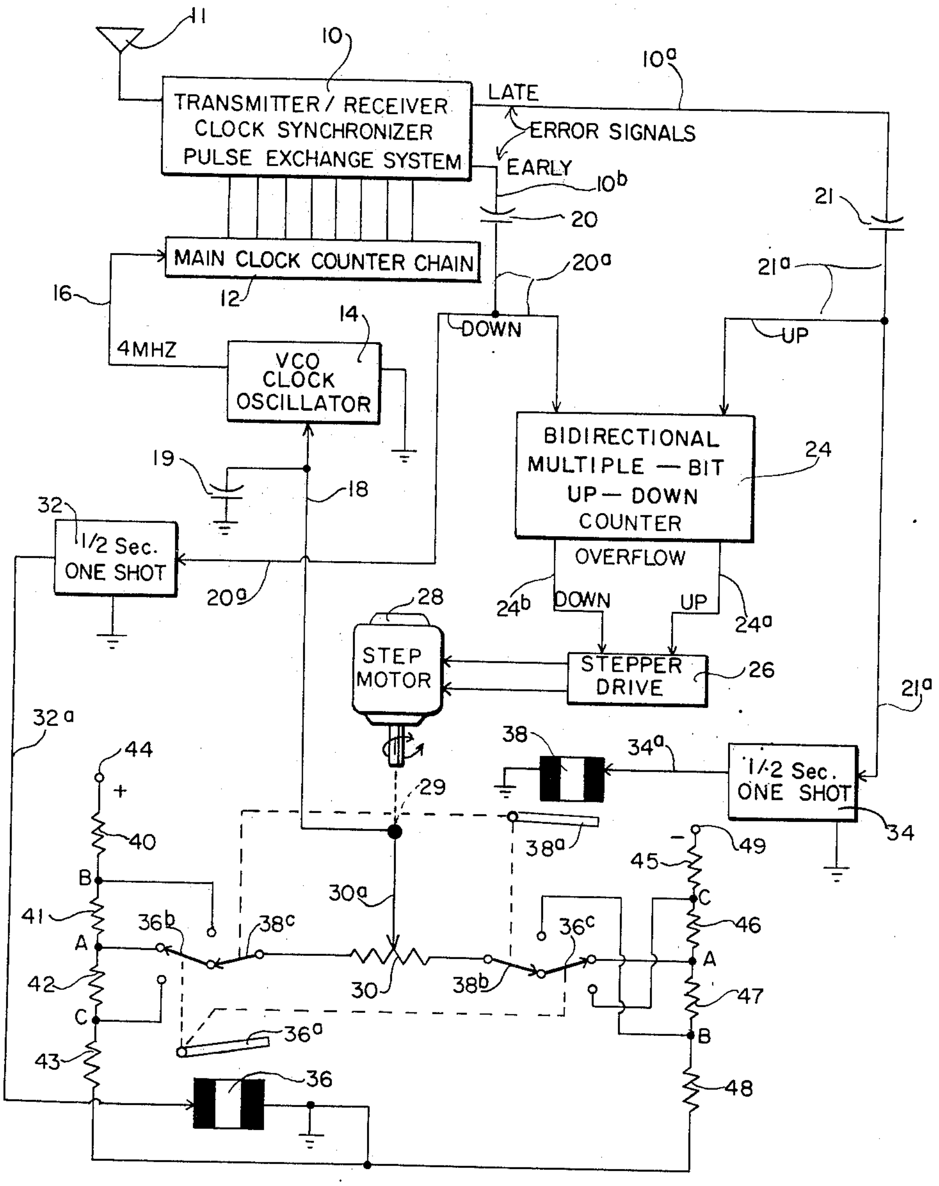
INVENTORS
WILLIAM T. LENNON jr.
FREDERICK G. REINAGEL
BY
ATTORNEYS 3,487,407

CLOCK FREQUENCY AND PHASE CORRECTION

William T. Lennon, Jr., and Frederick G. Reinagel, Tonawanda, N.Y., assignors to Sierra Research Corporation, a corporation of New York Filed Dec. 20, 1968, Ser. No. 785,672
Int. Cl. G01s 9/02
U.S. Cl. 343—7.5 10 Claims

ABSTRACT OF THE DISCLOSURE

The disclosure provides a combined means for correcting both the frequency and the phase of the clock oscillator in a time-sharing system, for example of the type used in aircraft navigation and traffic control systems, and is illustrated by an embodiment using non-destructive-memory drive means for incrementing a variable parameter of the clock oscillator for frequency correction, in combination with temporary shifts of the parameter which shifts persist for a fixed interval of time for the purpose of phase correction, plural consistent phase corrections in the same direction actuating in incremental non-temporary change in the position of the frequency control means.

This invention relates to improved means for correcting the phase and frequency of a clock oscillator of the type, for example, which drives a counter chain serving to provide a repeating cycle of time divisions.

The invention will be described with reference to an illustrative embodiment showing an aircraft traffic control system where it has particular utility, although it is to be understood that the invention is useful for the purpose of correcting the phases and frequencies of oscillators driving other types of precision circuitry and including non-destructive memory means, especially where synchronization with other units is desirable.

It is a principal object of this invention to provide an oscillator correction circuit which provides for both frequency and phase correction of its output so that very fine corrections can be made to provide the great precision required at the present time, when for instance aircraft collision avoidance systems are splitting microseconds in order to attain ranging accuracies measured in feet. The present invention is especially well adapted for use in systems such as that shown in Michnik and Reinagel Patent 3,336,591, or that shown in the pending application of Michnik Ser. No. 754,073, entitled "Mobile Clock Synchronization Techniques," or the system shown in the pending application of Michnik Ser. No. 710,990, entitled "CAS Receive-Only Clock Synchronization," or the system shown in the pending application of Michnik and Prast Ser. No. 754,074, entitled "Synchronized Vortac/TACAN CAS System," or the system shown in Bates, Prast and Scott pending application Ser. No. 672,357, entitled "Hierarchy Clock Synchronization," now U.S. Patent No. 3,-440,652, all belonging to the assignee of this disclosure. There are many other prior art systems in which the present combined frequency and phase control would be useful, for instance in Bagnall Patent 3,167,722, or in Perkinson Patent 3,250,896 which already shows an ordinary motor used to turn a shaft to vary the level of a parameter of the clock oscillator, in this instance the capacity across a tuned circuit.

It is another major object of this invention to provide both phase and frequency correction capabilities which are interrelated with respect to magnitude in such a way as to result in accurate clock oscillator corrections having only very small increments between successive steps of the smallest size. For purposes of phase correction the clock oscillator is driven ahead or behind in response to late or early signals from the clock synchronization system which is presumed to exist for purposes of the present disclosure, for instance as shown in FIGURE 6 of the above mentioned Michnik and Reinagel Patent 3,336,591. This change in frequency is only temporary and persists over a fixed interval of time, for instance one-half second. At the end of the interval, the clock frequency is allowed to revert, so that the net effect is a change in phase rather than frequency. During the shift interval, in one practical system now being built, the clock frequency is shifted such that the change amounts to $\pm 25$ parts in $10^9$, i.e. to put in a fixed phase change in the advance direction for each "late" signal, or in the retard direction for each "early" signal from the clock synchronizer system.

Frequency correction differs from phase correction in that its changes are not temporary, but remain indefinitely until a different position of the oscillator frequency control becomes necessary. A stepping motor provides bidirectional steps amounting to about $\pm 500$ corrective increments in the practical system referred to above. For instance, if the clock is slow by 10 parts in $10^9$, then, it will accumulate errors at a rate of about 10 nanoseconds per second, or 100 nanoseconds in 10 seconds. If the available phase corrections amount to 25 nanoseconds per interval of shift, four such corrections would be required after 10 seconds. Counter means are employed to count the number of consecutive phase corrections in one direction, and when an arbitrarily-selected number thereof has transpired, without intervening oppositely-phased corrections, then a step-frequency change is made. If it is assumed that four consecutive phase corrections are required to actuate a frequency correction, then in the present numerical example such a correction will now be made, for instance to correct the frequency by 1 part in $10^9$. As a result thereof, the originally assumed clock error of 10 parts in $10^9$ becomes 9 parts in $10^9$, and if it is assumed that the local synchronization unit makes a total of just one "early" or "late" decision per second of operation subsequently it will require about eleven seconds for four more clock phase corrections to be made, thereby actuating another frequency correction, reducing the clock frequency error to 8 parts in $10^9$, and so on until the error is virtually eliminated. This results in an essentially exponential elimination of the error. For example, by the time the clock error amounts to only 2 parts in $10^9$ it will require about 50 seconds to accumulate four phase corrections to actuate a frequency step to lower the error to 1 part in $10^9$. Actually, the exponential rate will be affected by tendencies of the clock frequency to drift away from the desired frequency, such as ageing effects, random ambient variations, noise, jitter, etc., which will tend to upset the arrival at perfect synchronization, so that a practical system may correct toward an accuracy of about one part in $10^9$.

The sizes of the phase and frequency corrections can be selected to suit the particular needs of a system with regard to ultimate degree of synchronization and rate of synchronization required. For instance, an aircraft stationkeeper system requires closer clock synchronization between units than a collision avoidance system because in the former case the aircraft are flying very close together, whereas in the latter case the aircraft tend to avoid close proximity. The above described numerical example is adequate for a stationkeeping system, whereas in a collision avoidance or traffic control system coarser shifts in the neighborhood of 250 nanosecond corrections are satisfactory. If four such phase corrections are required to actuate a frequency correction increment, then frequency corrections will be slowed by 10:1 so that correction of a 10 part in $10^9$ error to an error of one part in $10^9$ will require about 1930 seconds, and correction from an error of 20 parts in $10^9$ to 10 parts in $10^9$ will require about 590 seconds. This time can however be reduced by reducing the number of phase corrections which would have to be made before a frequency correction would be actuated.

Another important object of the invention is to provide memory means which is not destroyed by a brief power failure, such as the stepping-motor control shown in the present embodiment, to control the frequency adjusting parameter of the oscillator so that the frequency adjustment magnitudes are all of uniform size and can therefore be related by an accurately determined scaling factor to the phase corrections whose magnitudes are also accurately controlled by making uniform the size and duration of each phase shift. Other types of control memories, such as non-destructive magnetic memories, are contemplated for remembering the adjustment of the frequency determining parameter and incrementing it to accomplish frequency control.

It is a further object of the invention to provide a practical circuit for accomplishing both phase and frequency correction of the oscillator means by controlling and selectively shifting the level of the same control parameter of the oscillator.

Other objects and advantages will become apparent during the following discussion of the drawing wherein:

The drawing is a block diagram showing one practical embodiment of a phase and frequency correction system according to the present invention.

Referring now to the illustrative embodiment, it will be assumed that the illustrated clock oscillator phase and frequency correction circuit is coupled to an already existing synchronization system for indicating whether the local clock is running early or late. For instance, it could be coupled to the early/late circuitry shown in the Michnik and Reinagel patent mentioned above, such a system including transmitter and receiver means for exchanging pulses between clock synchronization equipment in the present unit and a clock synchronizer which is remotely located and capable of providing synchronization information. This entire process of making "early" and "late" decisions and issuing appropriate signals based thereon is schematically included in the box labeled 10 in the present block diagram, this synchronization system being coupled to an antenna 11, and being further coupled to a main clock counter chain 12 which is driven by a clock oscillator 14 oscillating at an appropriate rate. This clock oscillator delivers clock pulses, for instance at the rate of 5 mHz., via the wire 16 to pulse the main clock counter chain 12. These components are for the most part found in all aircraft navigation, collision avoidance and stationkeeping systems, with the possible exception of the fact that in the present example the clock oscillator 14 has a controllable parameter by which its own oscillation rate is adjusted. In the particular example, the oscillation rate of the clock oscillator 14 is voltage controlled via the wire 18, although other controllable parameters such as inductance and capacitance could be resorted to by merely changing details of the oscillator involved. A capacitor 19 is illustrated across the voltage control wire 18 for the purpose of smoothing transients which might otherwise tend to occur at the voltage control input to the oscillator.

The clock synchronizer 10 is assumed to deliver a "late" signal via the wire 10*a* or an "early" signal via the wire 10*b* as a result of each exchange of pulses with another unit which would comprise the synchronizer unit (not shown). The wires 10*a* and 10*b* may be thought of as corresponding with the wires 130 and 132 as illustrated in the Micknik and Reinagel patent in FIGURE 6. Capacitors 20 and 21 are provided so that the output of the early and late signal appearing on wires 20*a* and 21*a* will comprise brief pulses. Each such pulse, whether an early pulse or a late pulse, operates to change the count one way or the other in a bi-directional counter 24, the early pulses counting the counter 24 down and the late pulses counting the counter 24 up. This up-down counter 24 may include any desired number of counts but in the present example is assumed to include four counts. It operates such that when counted upwardly four times in a row it will overflow via the wire 24*a*, and when counted downwardly by more than four pulses on wire 20*a* it will deliver an overflow via the wire 24*b*. The total count in the counter at any one time is determined by how many up pulses have been received as compared with how many down pulses, and it is therefore possible by alternate insertion of up and down counts to arrive at a situation in which no output appears on the overflow wires 24*a* or 24*b*.

However, when an output does appear on either of these wires, it pulses the stepping motor drive circuit 26 to drive the stepping motor 28 either in the forward or the reverse direction depending on whether the pulse arrived via the wire 24*b* or via the wire 24*a*. Thus, an alternate interspersion of early and late signals on the wires 10*a* and 10*b* may not cause the stepping motor 28 to move, whereas a preponderance of either early pulses or late pulses will cause the stepping motor to move in one direction or the other depending on which type of error signal predominates. The incrementing motion of the stepping motor 28 is coupled through a suitable drive means, such as a gear box (not shown) as represented by the dashed lines 29, to drive the wiper arm 30*a* of a potentiometer 30 across which a potential is developed. The position of the arm 30*a* determines the control voltage level introduced via the wire 18 into the voltage-controlled clock oscillator 14, and therefore a step-by-step incremental change can be made in the frequency of the oscillator 14 by pulsing the stepping motor 28 in one direction or the other. When not being pulsed, the stepping motor 28 maintains the wiper arm 30*a* at the position to which it was most recently incremented.

Error signals appearing on the wires 10*a* and 10*b* are conducted via the wires 21*a* and 20*a* into suitable one-shots 32 and 34 which transform narrow pulses arrived at by differentiation in the capacitors 20 and 21 into pulses of definite duration, in the present example one-half second. It is assumed that the one-half second outputs from the one-shots 32 and 34 appearing on wires 32*a* and 34*a* have sufficient power to energize the windings of relays 36 and 38 in order to attract the armatures 36*a* and 38*a* toward the windings in the usual manner of operation of a relay. The relays 36 and 38 are of the double pole, double throw variety, and therefore each includes two switch members, which are shown in their normal positions in the drawing. When the windings of the relays are energized, the contacts are switched from their normal positions to their alternative positions.

With both relays 36 and 38 de-energized, the potentiometer 30 will be connected at its opposite ends through the contacts of both relays to the points AA of the voltage divider formed by the resistances 40, 41, 42, 43, 45, 46, 47 and 48. Since these resistances form a chain whose center is grounded, but which extends between a positive voltage source 44 and a negative voltage source 49, a potential difference will appear across the potentiometer 30 and will develop a voltage at the wiper arm 30*a* referenced to ground potential which voltage will determine the present frequency of the voltage controlled oscillator 14. If an output appears on the wire 20*a* as a result of an "early" error signal, the relay 36 will be actuated for one-half second and will move the wiper arms 36*b* and 36*c* to the down positions, thereby connecting the potentiometer 30 to the positions marked C on the voltage divider chain, meaning that both ends of the potentiometer become more negative. However, the resistors 40 through 43 and 45 through 48, are so proportioned that the voltage drop across the potentiometer 30 will remain unchanged. Thus, there has been a net shift in negative direction of the potential on the wire 18, which shift for present illustrative purpose will be assumed to lower the frequency of the local oscillator, thereby making it run later. At the end of the one-half second duration of the wave form from the one-shot 32 on wire 32*a*, the relay 36 will be released and will return the wiper arms 36*b* and 36*c* to their normal positions which are shown connected to the terminals AA. Thus, for an interval of one-half second the voltage will have been lowered on the wire 18 and the oscillator 14 will have been slowed to make its phase position shift later in time.

Conversely, if the error signal appearing at the output of the synchronizer 10 comprises a "late" signal appearing on wire 10*a*, then the one-shot 34 will deliver an output for one-half second on the wire 34*a* for energizing the relay 38. As a result of such energizing, the armature 38*a* will be attracted toward the winding of the relay 38 and will thereby move the wipers 38*a* and 38*b* to their upper positions, thereby connecting the potentiometer 30 between the points labeled BB on the voltage divider. A change of the connection of the potentiometer 30 from the points A to the points B represents a net positive change in the potential at the wiper 30*a* of the potentiometer 30. The proportioning of the resistors 40 through 43, and 45 through 48, is such that the potential drop across the potentiometer 30 is not changed, but the entire level of the potentiometer 30, and therefore of the voltage control wire 18, is moved in a positive direction. By this means, it will be seen that for half a second the voltage level on the wiper 30*a* will be stepped upwardly, thereby raising the level of the control voltage delivered on the wire 18 to the clock oscillator 14, which is assumed to increase the frequency of the latter, and thereby help obviate the cause of the late signal appearing on wire 10*a*.

Thus, the present circuit provides both phase and frequency correction under appropriate circumstances. Phase corrections are produced by closing one or the other relay temporarily to change the level of voltage on the wire 18 either up or down in response to an appropriate error signal and maintaining this change for a one-half second interval. Whenever a certain number of like phase corrections occur in succession, these dominant phase-errors will count the up-down counter 24 in an appropriate direction and cause it to overflow and move the stepping motor 28 by one step. Thus, both phase and frequency corrections are accomplished using the same error signals and the same potential source to correct the clock oscillator 14.

As to magnitudes of the various corrections, the one-half second duration of the phase corrections can be varied by changing the time constants of the one-shots 32 and 34 which may, or may not, be equal to each other. The amount of frequency change occurring, as a result of closing either the relay 36 or the relay 38, can be varied by changing the time constants of the one-shots nals 44 and 49, or by adjusting the relative values of the resistors 40 through 43 and 45 through 48, or by changing the value or the taper of the potentiometer 30. The changes in potential between the points A, B and C may or may not be equal to each other. When making frequency changes as distinguished from phase changes, the bidirectional counter determines how many error signals of one type must exceed error signals of the other type before an output signal will be provided at whichever one of the outputs of the counter 24 is energized by the dominant error signal. In the present example the number four is used as the number of counts required to cause the counter 24 to overflow, but the scale factor of the system can easily be changed by changing this feature of the counter. By doing so, the system can be made to arrive either more quickly or more slowly at an equilibrium condition, the number of counts required to initiate a stepping motor change being a direct measure of the coarseness or fineness with which adjustment of the clock oscillator is to be accomplished.

Having thus described our invention and an exemplary embodiment thereof, we make the following claims:

1. In a synchronization system for correcting the clock means in one unit toward precise synchronization with the clock in another unit by exchange of synchronization signals between the units, said one unit including means for deriving "early" and "late" error signals from said exchange, means in the latter unit comprising:

(a) oscillator means forming a part of the clock means and driving it, the oscillator means having a variable input parameter operative to control its oscillation rate;

(b) bi-directional means for incrementing said parameter to levels which determine different stable frequencies of the clock means;

(c) intermittent means operative when actuated to temporarily shift the level of said parameter in a selected direction to change the phase of the clock means;

(d) actuating means responsive to said early and late signals to actuate said intermittent means in a direction tending to reduce the error; and (e) means responsive to plural consecutive error signals in the same direction to increment said bi-directional means in a direction which reduces the error.

2. In a system as set forth in claim 1, said actuating means including means operative for a predetermined interval of time in response to each error signal for actuating said intermittent means.

3. In a system as set forth in claim 1, said intermittent means including means for shifting the level of said parameter by a fixed amount when actuated, and said actuating means including means operative for a predetermined interval of time in response to each error signal for actuating said intermittent means.

4. In a system as set forth in claim 1, said bi-directional means comprising stepping means coupled to change the level of said parameter by a fixed increment for each step.

5. In a system as set forth in claim 1, said means responsive to consecutive error signals comprising up-down counter means having count-up and count-down inputs respectively connected to receive said different error signals and to be oppositely counted thereby, and the counter means having outputs which respectively become activated by completion of the full count respectively in the up and the down counting directions, and said outputs being connected to drive said bi-directional incrementing means.

6. In a system as set forth in claim 5, said bi-directional means comprising stepping means coupled to be driven in opposite direction by said outputs.

7. In a system as set forth in claim 1, said variable input parameter is an electrical potential level, a source of electrical potential, potentiometer means connected to said source and having means for delivering a potential to the input of said oscillator means dependent upon the adjusted position thereof, and means coupling the bi-directional incrementing means to adjust said position.

8. In a system as set forth in claim 7, said bidirectional means comprising stepping means for moving a fixed increment for each step.

9. In a system as set forth in claim 8, said means responsive to consecutive error signals comprising multiple-bit up-down counter means having separate inputs respectively connected to receive said different error signals and to be oppositely counted thereby, the counter-means having separate outputs respectively connected to drive said stepping means in opposite directions, one output being energized by overflow in the up direction and the other output being energized by overflow in the down direction.

10. In a system as set forth in claim 7, said intermittent means including means for changing the potential level of the source to which the potentiometer means is connected by fixed amounts in either direction, and said actuating means including means operative for a predetermined interval of time in response to each error signal for actuating said intermittent means.

References Cited

UNITED STATES PATENTS 3,262,111 7/1966 Graham ------------ 343—7.5

RODNEY D. BENNETT, Jr., Primary Examiner

T. H. TUBBESING, Assistant Examiner